(12) United States Patent
Kwon et al.

(10) Patent No.: US 12,567,027 B2
(45) Date of Patent: Mar. 3, 2026

(54) INVENTORY CHARACTERIZATION AND IDENTIFICATION SYSTEM

(71) Applicant: Toshiba Global Commerce Solutions Holdings Corporation, Tokyo (JP)

(72) Inventors: Elizabeth C. Kwon, Carthage, NC (US); Jingtong E, Chapel Hill, NC (US); Maxwell Grayson Owens, Fuquay-Varina, NC (US); Jessica Snead, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 271 days.

(21) Appl. No.: 17/884,906

(22) Filed: Aug. 10, 2022

(65) Prior Publication Data

US 2024/0054447 A1    Feb. 15, 2024

(51) Int. Cl.
G06Q 10/087 (2023.01)
G06Q 10/083 (2024.01)

(52) U.S. Cl.
CPC ......... G06Q 10/087 (2013.01); G06Q 10/083 (2013.01)

(58) Field of Classification Search
CPC ........................... G06Q 10/087; G06Q 10/083
See application file for complete search history.

(56) References Cited

U.S. PATENT DOCUMENTS

| | | | |
|---|---|---|---|
| 6,370,222 B1 | 4/2002 | Cornick, Jr. | |
| 2006/0257005 A1* | 11/2006 | Bergeron ................. | G01V 5/22 |
| | | | 382/209 |
| 2008/0243898 A1* | 10/2008 | Gormish ................. | G06F 21/64 |
| | | | 707/999.102 |
| 2011/0175727 A1 | 7/2011 | Aikaterinidis | |
| 2017/0178060 A1* | 6/2017 | Schwartz ............. | G06Q 10/087 |
| 2021/0090192 A1* | 3/2021 | Norton ................... | G06Q 10/08 |
| 2021/0133666 A1* | 5/2021 | Eckman ................... | G06T 7/62 |
| 2022/0215759 A1* | 7/2022 | Edwards ................. | G06F 16/26 |
| 2024/0013371 A1* | 1/2024 | Govindan .............. | G06V 20/64 |

OTHER PUBLICATIONS

Majid Abdolshah, Classification of X-Ray images of shipping containers, Jan. 31, 2017, Expert Systems With Applications 77 (2017) 57-65 (Year: 2017).*

* cited by examiner

*Primary Examiner* — Aaron N Tutor

(74) *Attorney, Agent, or Firm* — Stanek Lemon Crouse & Meeks, PA

(57) ABSTRACT

Disclosed herein are systems and methods for identifying contents of a shipping container that holds a set of unidentified inventory items. To characterize the identity of the unidentified inventory items, one or more scans may be performed on shipping container to obtain container information, which can include a physical attribute of the shipping container, a physical attribute of an item in the shipping, or logistics information relating to the shipping container. Using the container information and stored inventory data, an identity of the unidentified inventory can be characterized, and a confidence value may be determined.

17 Claims, 6 Drawing Sheets

300

| Container Dimensions (ft) [l x w x h] | Container Weight (lbs) | Container Delivery Day | Composition of Item |
|---|---|---|---|
| 3 x 3 x 4 | 235 | Tuesday | Metal |

New Observation (without target variable or label) → Trained Model 345 → Output 350

602 — OBTAIN CONTAINER INFORMATION RELATING TO A SHIPPING CONTAINER

604 — OBTAIN INVENTORY DATA

606 — CHARACTERIZE AN IDENTITY OF AN ITEM WITHIN THE SHIPPING CONTAINER

608 — DETERMINE A MEASURE OF CONFIDENCE

610 — CAUSE AN ACTION BASED ON THE MEASURE OF CONFIDENCE

INVENTORY CHARACTERIZATION AND IDENTIFICATION SYSTEM

BACKGROUND

In current inventory management system, inventory that is not initially received and reported accurately during the inbound processes (e.g., by the company's Receiving Department), it becomes nearly impossible to maintain an accurate system or record. This affects all aspects of logistics services, manufacturing processes, and the supply chain.

Figure 1:
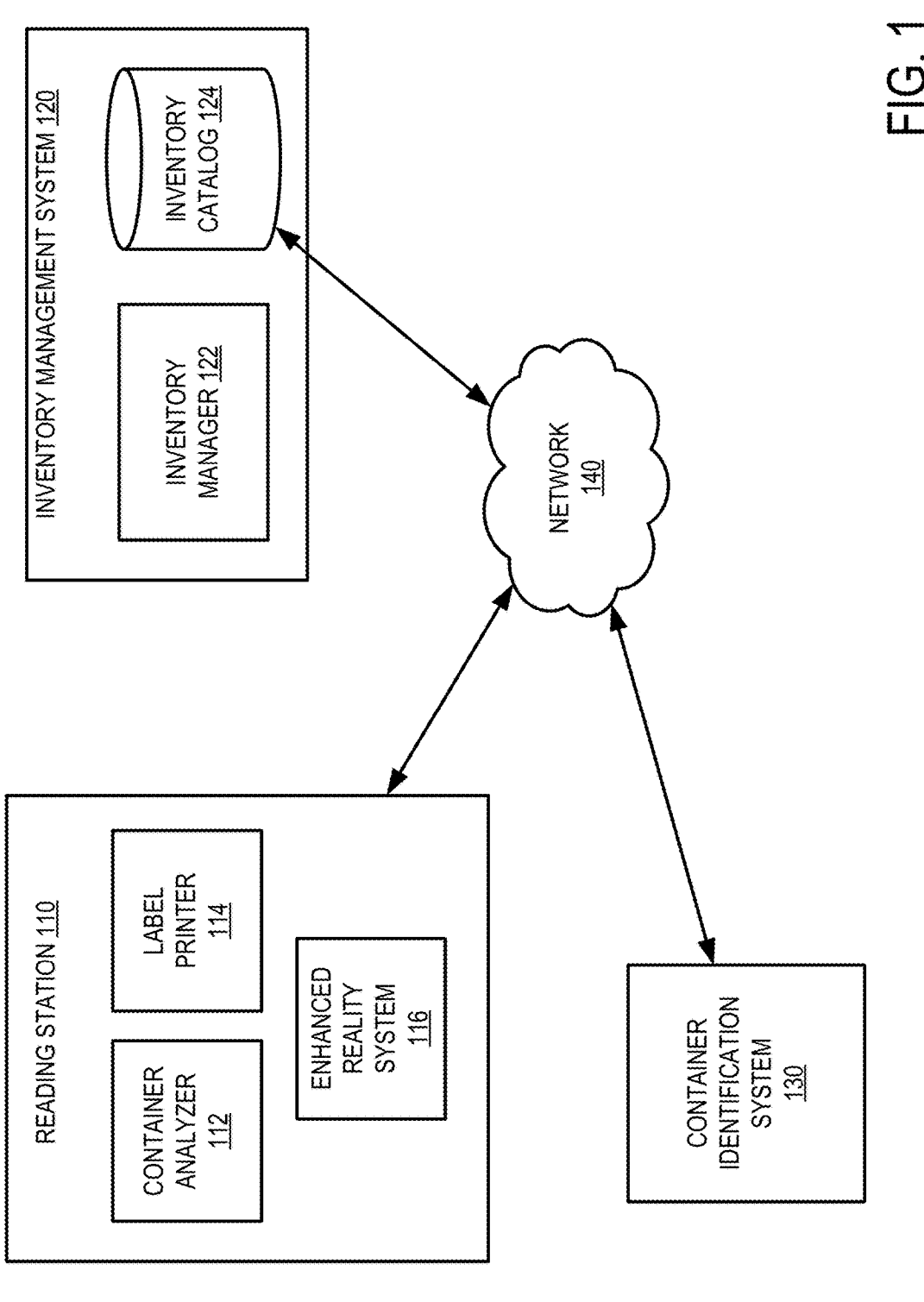
FIG. 1 illustrates an embodiment of an inventory management environment for applying an automated process for identifying the contents of a shipping container.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

For purposes of this disclosure, the terms "container" or "shipping container" are used interchangeably to broadly refer to any container used for shipping. By way of non-limiting example, a container can include one or more of a box, a crate, a bag, or an envelope. As another example, the container can include a vessel for smaller items or a vessel for freight shipping.

A packing slip—which often lists the weights, dimensions, SKUs (Stock Keeping Units), number of units, etc. in a shipment—can play an important role in terms of inventory management. To that end, when a packing slip is unavailable, the supply chain procedures carried out in a warehouse can become disjointed and inefficient. For example, warehouse members may resort to manually opening boxes to count or identify materials, which can cause significant delays, introduce inventory uncertainties, and increase operation costs, among other things.

To address these or other challenges, a container management system can be implemented to apply a rigorous and automated process to identify the contents of a container, without relying solely on information from a packing slip and without requiring the container to be opened and the contents manually reviewed. The container management system can analyze the container to determine container information, evaluate the container information against stored inventory data, and characterize an identity and/or number of items in the container based on the evaluation. Furthermore, the container management system can generate a confidence parameter indicating how closely the container information matches the stored inventory data for the predicted item. Based on the identity of the item and/or the confidence parameter, the container management system can cause an action, such as updating the stored inventory information to indicate the predicted item has been received/processed (e.g., when confidence is high) or outputting an instruction to manually open and review the contents of the shipping container (e.g., when confidence is low). By electronically identifying the contents of the container (in many cases, without requiring the container to be opened), the container management system advantageously improves efficiencies and accuracies in inventory management, as well as improves the usage of facilities and labor.

The container management system can implement a machine learning system to apply a rigorous and automated process to identify the contents of containers accurately and efficiently. The machine learning system can enable recognition and/or identification of tens, hundreds, thousands, or millions of features and/or feature values for tens, hundreds, thousands, or millions of observations, thereby increasing accuracy and consistency and reducing delay associated with the relative resources (e.g., computing or human) required to be allocated for tens, hundreds, or thousands of operators to manually identify the contents of containers using the features or feature values.

The container management system can create and implement a confidence generation policy to provide an objective authority to govern how and when to calculate the confidence parameter. In particular, the confidence generation policy can be structured by rules and best practices for inventory management. By generating the confidence parameter according to the confidence generation policy and recording the predicted identity in the inventory data when the confidence parameter satisfies a confidence threshold, the container management system can advantageously ensure a congruity between the actual inventory in the warehouse and the stored inventory data.

In light of the description herein, it will be understood that the embodiments disclosed herein substantially improve inventory management efficiency and accuracy. Specifically, the embodiments disclosed herein enable a container management system to improve the performance of a reading station by enabling automated analysis of containers using a set of scans to obtain real-time measurements and other information. The ability to determine the contents of the container using the real-time information accurately and efficiently enables the underlying systems to manage inventory more efficiently and accurately by reducing the number of containers with unidentified items, which improves the usage of facilities; and reducing the number of containers for manual inspection, which improves the usage of labor, reduces processing time, and increases accuracies.

Thus, the presently disclosed embodiments represent an improvement at least in inventory management. Moreover, the presently disclosed embodiments address technical problems inherent within inventory management, image processing, and database management. These technical problems are addressed by the various technical solutions described herein, including scanning of the container, obtaining shipping information and inventory data, evaluating real-time measurements and shipping information against the inventory data, determining a confidence parameter according to a confidence generation policy, etc. Thus, the present application represents a substantial improvement on existing inventory management systems in general.

It will be appreciated that the inventive concepts described herein may be applied in contexts other than warehouse and inventory management. For example, similar techniques to those described herein can be applied in grocery store management, warehouse management, retail store management, online marketplace management, hospital management, etc.

FIG. 1 illustrates an embodiment of an inventory management environment 100 for applying an automated process for identifying the contents of a shipping container. The environment 100 includes a reading station 110, an inventory management system 120, a container management system 130, and a network 140. In the illustrated embodiment, the reading station 110 includes a container analyzer 112, a label printer 114, and an enhanced reality (XR) system 116. Furthermore, the inventory management system 120 includes an inventory manager 122 and an inventory catalog 124. To simplify discussion and not to limit the present disclosure, FIG. 1 illustrates only one reading station 110, container analyzer 112, label printer 114, XR system 116, inventory management system 120, inventory manager 122, inventory catalog 124, and container management system 130, though multiple may be used.

Any of the foregoing components or systems of the environment 100 may communicate via the network 140. Although only one network 140 is illustrated, multiple distinct and/or distributed networks 140 may exist. The network 140 can include any type of communication network. For example, the network 140 can include one or more of a wide area network (WAN), a local area network (LAN), a cellular network, an ad hoc network, a satellite network, a wired network, a wireless network, and so forth. In some embodiments, the network 140 can include the Internet.

Any of the foregoing components or systems of the environment 100, such as any combination of the reading station 110, container analyzer 112, the label printer 114, the XR system 116, the inventory management system 120, the inventory manager 122, the inventory catalog 124, or the container management system 130 may be implemented using individual computing devices, processors, distributed processing systems, servers, isolated execution environments (e.g., virtual machines, containers, etc.), shared computing resources, or so on. Furthermore, any of the foregoing components or systems of the environment 100 may host or execute one or more client applications, which may include a web browser, a mobile application, a background process that performs various operations with or without direct interaction from a user, or a "plug-in" or "extension" to another application, such as a web browser plug-in or extension.

The reading station 110 can capture or other obtain container information relating to one or more containers to be processed. In some cases, a container to-be-processed is unopened and/or includes one or more unknown items therein. The container information can include, but is not limited to, a physical attribute of the container. For example, the container information can include one or more dimensions of the container (e.g., length, width, height), a weight of the container, a composition of the container (e.g., cardboard, plastic, paperboard, etc.), a type of container (e.g., a vessel for freight shipping, a box, a crate, a bag, an envelope, etc.), or whether the box is sealed (unopened) or unsealed (opened). Furthermore, the container information can include, but is not limited to, a physical attribute of an item within the container or a collective attribute of items within the container. For example, the container information can include one or more dimensions of the item(s), a shape of the item(s), a composition of the item(s) (e.g., metal, plastic, paper, resin, etc.), or a 2D or 3D model of the item. Furthermore, the container information can include, but is not limited to, logistics information relating to the container. For example, the container information can include a date of arrival (e.g., Saturday, September 17), a time of day of arrival (e.g., 1:07 PM), a carrier (e.g., FedEx), a number of overall containers or similar containers in the same delivery, etc. In some cases, the container information includes data usable to determine a physical attribute of the container, a physical attribute of the item, or logistics information. The container information may be processed (e.g., in real-time) and communicated to the container management system 130, the inventory management system 120, or the like.

In the illustrated example, the reading station 110 includes a container analyzer 112, a label printer 114, and an XR system 116. It will be appreciated that the reading station 110 represents an example reading station and other examples may use fewer, additional, or different components or arrangements. For example, in some cases, the reading station 110 may not include label printer 114 and/or an XR system 116.

The container analyzer 112 can process a container to obtain container information. The container analyzer 112 may include one or more devices for obtaining container information. For example, container analyzer 112 can include, among other things, an imaging device, an item-detection device, a weighing device, a user input device, etc.

An imaging device can be configured to obtain one or more images of a container, such as images from different perspectives of the container. As another example, the imaging device may be configured to obtain one or more images of container documentation (e.g., a packing slip, a shipping label, etc. The reading station 110 and/or another component (e.g., the container management system) can process the one or more images to determine container information (e.g., in real time). In some cases, the images may be processed using a trained machine learning system. The container analyzer 112 can store all of the captured images. Alternatively, the container analyzer 112 may store only certain selected ones of the captured images. For example, the container analyzer 112 may process or pre-process the images in real time or near real time to identify which images, if any, includes satisfactory images of a container. In some cases, the imaging device can be implemented as a camera.

An item-detection device can be configured to obtain information relating to an item within the container. For example, the item-detection device can be configured to obtain data to determined edges, shapes, compositions (e.g., metal, non-metal), bulkiness, a skeleton, etc. of the item(s) with the container. The reading station 110 and/or another component (e.g., the container management system) can process the information to determine container information (e.g., in real time). In some cases, the information may be processed using a trained machine learning system. In some cases, the imaging device can be implemented as an infrared camera, an x-ray device, a sonic imager, a metal detector, an ultrasonic probe, or other type of imaging probe.

A weighing device can be configured to obtain weight information relating to the container or an item within the container. For example, the weighing device can obtain the weight of the container. As another example, the weighing device can obtain the weight of an item in the container, such as by utilizing known weights of packages supplies (e.g., weight of the box itself, weight of packing filler, etc.). The reading station 110 and/or another component (e.g., the container management system) can process the weight information to determine container information (e.g., in real time). In some cases, the weight information may be processed using a trained machine learning system. In some cases, the imaging device can be implemented as a scale, a force sensor, etc.

A user input device can be configured to obtain container information via user input and/or communication with a data store (e.g., the inventory catalog 124). For example, the user input device can allow an operator to enter known container information, such as container information obtained via measurements performed by the operator and/or container information obtained from container documentation. In some cases, the user input device obtains logistics information or other container information.

The reading station 110 may include hardware and software components for establishing communications over the network 140. The reading station 110 may have varied local computing resources such as central processing units and architectures, memory, mass storage, graphics processing units, communication network availability and bandwidth, and so forth. Further, the reading station 110 may include any type of computing system. For example, the reading station 110 may include any type of computing device(s), such as desktops, laptops, and wireless mobile devices (for example, smart phones, PDAs, tablets, or the like), to name a few. The implementation of the reading station 110 may vary across embodiments. For example, in some cases, one or more components of the reading station 110 (e.g., the container analyzer) may be implemented as a portable or handheld device. As another example, in some cases, one or more components of the reading station 110 may be implemented as a fixed platform or a device that is fixed in a particular location.

Through the use of the reading station 110, a user can scan containers singularly or in bulk. For example, in some cases, the reading station 110 can perform one action on all of the containers scanned or can scan containers individually and perform more granular actions. For example, a shipment may include ten similar (e.g., seemingly identical in size, shape) containers. In some cases, the number of similar containers can be part of the container information and may be used to filter the options of possible items within the containers.

As shown, the reading station 110 can include a label printer 114 for printing documentation for a container. For example, the reading station 110 can include a graphical user interface, an application programming interface, etc. that can send data to the label printer 114 for the creation of labels for containers processed by the reading station 110. In some scenarios, as part of the processing, the label printer 114 can generate a label to be affixed to, included in, or otherwise associated with the container. The label printer 114 can be used to print the new label. In some embodiments, the new label can include information that is useable to identify some or all of the container information. In addition or alternatively, the new label can include information that is usable to identify the predicted identifier for the item in the container. In some cases, the new label included information similar to a packing slip. In some embodiments, the label printer 114 can be configured to print a bar code or QR code and/or print onto a label that already includes a bar code or QR code.

The reading station 110 can include an XR system. The XR system can be implemented as a wearable system (also referred to herein as an augmented reality (AR) system) and can be configured to present two-dimensional (2D) or three-dimensional (3D) virtual images to a user. The images may be still images, frames of a video, or a video, in combination or the like. The XR system can include a wearable device that can present a VR, AR, or MR environment, alone or in combination, for user interaction. The XR system can be a head-mounted device (HMD) which is used interchangeably as an AR device (ARD).

The XR system 116 can be configured to display a virtual model (e.g., a 2D model, a 3D model, an augmented reality (AR) model, a mixed reality (MR) model, or a digital image) of an item determined to be within a container. For example, the XR system may overlay or superimpose a virtual model of the item on a respective package, thereby providing an augmented reality environment. In some cases, the reading station 110 generates or constructs the virtual model of the item using data captured by the reading station 110. For example, the reading station 110 can scan (e.g., using x-ray or other item-detection device) the container can generate a dataset of items. Definable features of the geometry of the item can be determined based on the scanned dataset. In this way, dimensions, shapes, contours, sizes, or the like of the item can be determined based on the data relating to the definable features from the scanned dataset, and the virtual model can be generated. In some cases, the XR system 116 is implemented as a head-mounted display, such as a see-through head-mounted display. For example, the XR system 116 can render at least a portion of the virtual model as an augmented reality overlay that overlays on the container when the container is viewed through the see-through head-mounted display.

Although reference is made throughout the specification to the reading station 110 performing various analytical or processing functions, it will be understood that, in some embodiments, the container management system 130 performs these functions, and the reading station 110 is used to acquire data for communicating to the container management system 130. In such embodiments, the reading station 110 can receive notifications of processing functions performed by the container management system 130, such as indications of the processing completion. Accordingly, in some embodiments, the amount of processing performed by the reading station 110 can be reduced and/or minimized, and the reading station 110 can act as a conduit to the container management system 130. In this way, the hardware requirements and costs of the reading station 110 can be reduced in favor of a larger or more robust container management system 130. In certain embodiments, the reading station 110 can include the container management system 130 and perform all of the functions described herein.

The inventory management system 120 can include an inventory manager 122 and an inventory catalog 124. As described herein, the inventory management system 120 may be implemented using individual computing devices, processors, distributed processing systems, servers, isolated execution environments (for example, virtual machines, containers, etc.), shared computing resources, or so on.

The inventory manager 122 can be used to manage, create, develop, or update inventory in the inventory management environment 100. For example, the inventory manager 122 can maintain the inventory catalog 124 with inventory data. The inventory manager 122 can populate the inventory catalog 124 and/or update it over time with inventory data that receives and/or generates. As inventory data changes, the inventory manager 122 can update the inventory catalog 124. In this way, the inventory catalog 124 can retain an up-to-date database of inventory data.

In some cases, the container management system 130 can include a local data store (not shown) for storing inventory data. For example, the local data store can include inventory data corresponding to recently created, developed, or updated scans performed by the reading station 110. In some cases, the inventory manager 122 can maintain the inventory catalog 124 by pinging the container management system 130 for inventory data or passively receiving it based on the container management system 130 independently reporting the inventory data. For instance, the inventory manager 122 can ping or receive information from the container management system 130 at predetermined intervals of time, such as every X number of hours, or every X days, etc. In addition or alternatively, the container management system 130 can be configured to automatedly send its inventory data to the inventory manager 122 and/or the inventory catalog 124. In some cases, the inventory catalog 124 can be manually updated or updated responsive to new inventory orders.

Furthermore, the inventory manager 122 can transmit the inventory data to the container management system 130 via data packets, such as part of an update to the container management system 130. For instance, the inventory manager 122 can communicate inventory updates to the container management system 130 at predetermined intervals of time, such as every day, week, or month. In some cases, the inventory manager 122 provides the inventory data when the inventory data, or updates thereto, becomes available from the inventory manager 122. In some cases, the inventory manager 122 provides the inventory data when an order is submitted or received. As another example, the container management system 130 can query the inventory manager 122 for inventory data or can download inventory data from the inventory catalog 124.

The inventory catalog 124 can store inventory data. In some embodiments, the inventory data can include container information, such as historical container information. In some cases, the inventory data can include information such as a product's name, SKU number, description, pricing, quantity, dimensions, weight, or other container information. In some cases, the inventory catalog 124 includes a comprehensive or semi-comprehensive, itemized list that details every product a company has in stock or has ordered, including raw materials, work-in-progress items, finished goods, etc. In some cases, inventory catalog 124 includes information regarding inventory purchases, inventory deliveries, items not yet received, or unexpectedly received items. In some cases, the inventory catalog 124 includes expected shipping information for some or all of the items. For example, the inventory catalog 124 may indicate a Product Y is often shipped by Carrier G and is often received on Tuesdays. As described herein, by evaluating container information obtained by the reading station 110, as well as inventory information stored in the inventory catalog 124, the container management system 130 can characterize (e.g., determine) the identity of an item within a container.

The inventory catalog 124 can be maintained (for example, populated, updated, etc.) by the inventory manager 122. As mentioned, in some embodiments, the inventory manager 122 and inventory catalog 124 can be separate or independent of the container management system 130. Alternatively, in some embodiments, the inventory manager 122 and/or inventory catalog 124 are part of the container management system 130. Furthermore, in some cases, the inventory catalog 124 can be separate from or included in, or part of, the inventory manager 122. As described herein, a particular item identifier can be associated with various other inventory data. The item identifiers can be implemented as alphanumeric identifiers or other identifiers that can be used to uniquely identify one item identifier from another item identifier stored in the inventory catalog 124. For example, each item identifier can correspond to a particular product, and the associated inventory data can include information relating to that product. In some such cases, as described herein, the item identifier can be used to identifier associated inventory data. Similarly, actual inventory data can be used to identifier an item identifier.

The inventory catalog 124 can include or be implemented as cloud storage, such as Amazon Simple Storage Service (S3), Elastic Block Storage (EBS) or CloudWatch, Google Cloud Storage, Microsoft Azure Storage, InfluxDB, etc. The inventory catalog 124 can be made up of one or more data stores storing data that has been received from one or more of the reading station 110, the container management system 130, or the inventory manager 122, or data that has been received directly into the inventory catalog 124. The inventory catalog 124 can be configured to provide high availability, highly resilient, low loss data storage. The inventory catalog 124 can include Amazon CloudWatch metrics. In some cases, to provide the high availability, highly resilient, low loss data storage, the inventory catalog 124 can store multiple copies of the data in the same and different geographic locations and across different types of data stores (for example, solid state, hard drive, tape, etc.). Further, as data is received at the inventory catalog 124 it can be automatically replicated multiple times according to a replication factor to different data stores across the same and/or different geographic locations.

The container management system 130 can be used to identify the contents of a package. As described herein, the container management system 130 can communicate with the reading station 110 to obtain container information and can communicate with the inventory management system 120 to obtain inventory data. Using the container information and inventory data, the container management system 130 can determine an identity of the item(s) in a particular container. For example, as described herein, in some cases, the container management system 130 can implemented one or more machine learning methods to characterize the identity of the item(s) based on images of the container, container information, inventory data, etc. Furthermore, in some cases, the container management system 130 can generate a confidence parameter indicating a confidence associated with the determined identity of the item. In this way, the inventory management system 120 can improve the ability to process containers and accurately determine the identity of items therein.

Figure 2:
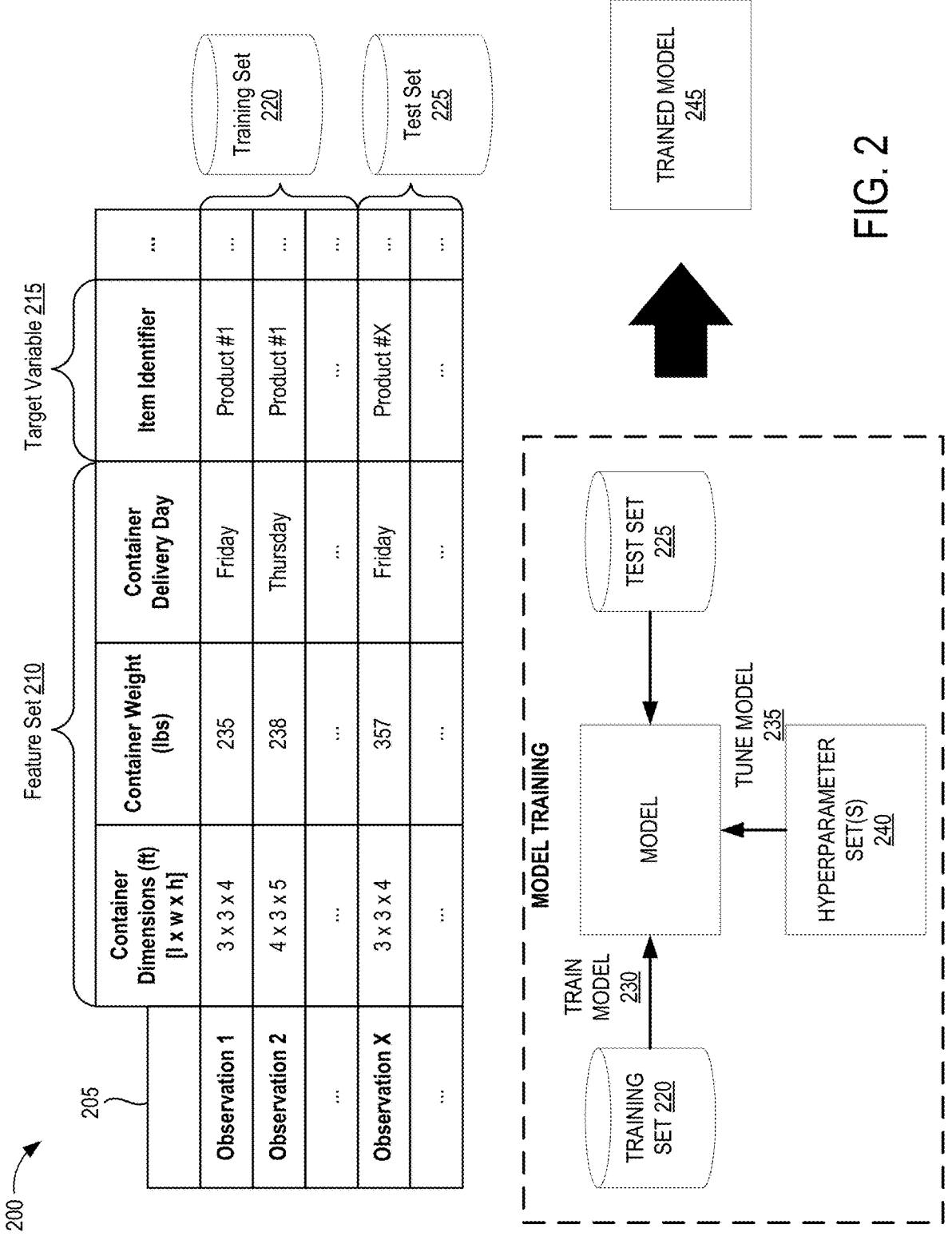
FIG. 2 is a diagram illustrating an example of training a machine learning model in connection with the present disclosure.

FIG. 2 is a diagram illustrating an example of training a machine learning model 200 in connection with the present disclosure. The machine learning model training described herein may be performed using a machine learning system. The machine learning system may include or may be included in a computing device, a server, a cloud computing environment, or the like, such as the container management system 130 of FIG. 1.

As shown by reference number 205, a machine learning model may be trained using a set of observations. The set of observations may be obtained and/or input from historical data, such as data gathered during one or more processes described herein. For example, the set of observations may include data gathered from the reading station 110, as described elsewhere herein. In some implementations, the machine learning system may receive the set of observations (e.g., as input) from the reading station 110 or from a storage device. In some cases, the set of observations may include data gathered from the inventory management system 120, as described elsewhere herein.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values.

In some implementations, the machine learning system may determine variables for a set of observations and/or variable values for a specific observation based on input received from the container management system 130. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from the container analyzer 112 or from an operator to determine features and/or feature values.

In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of container dimensions, a second feature of container weight, a third feature of delivery day, and so on. As shown, for a first observation, the first feature may have a value of "3×3×4", the second feature may have a value of "235", the third feature may have a value of "Friday", and so on. These features and feature values are provided as examples and may differ in other examples. For example, the feature set may include one or more of the following features: a weight of a container, a composition of a container, a material density of an item in the container, a composition of an item in the container, or a virtual 3D model of an item in the container, and a day of arrival of a container, a shipping carrier associated with the container, etc. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

The set of observations may be associated with a target variable 215. The target variable 215 may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 2, True or False, Yes or No, Male or Female), among other examples. A target variable may be associated with a target variable value, and a target variable value may be specific to an observation. In some cases, different observations may be associated with different target variable values.

In example 200, the target variable 215 is an item identifier, which has a value of "Product #1" for both the first observation and the second observation. As discussed herein, a container handling location may receive multiples of the same item over time. For example, the container handling location may receive a recurring shipping of Product #1. Example 200 emphasizes that the particular feature set 210 may vary across shipments, even when the same product is being delivery. This is due to many variables associated with shipping, such as available shipping supplies (e.g., box size), logistics delays, packaging density, etc. The feature set and target variable described above are provided as examples, and other examples may differ from what is described above. It will be understood that the target variable may vary across embodiments. For example, in some cases, the target variable 215 is 3D model of an item in the container.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set 210 that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 25%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 2.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
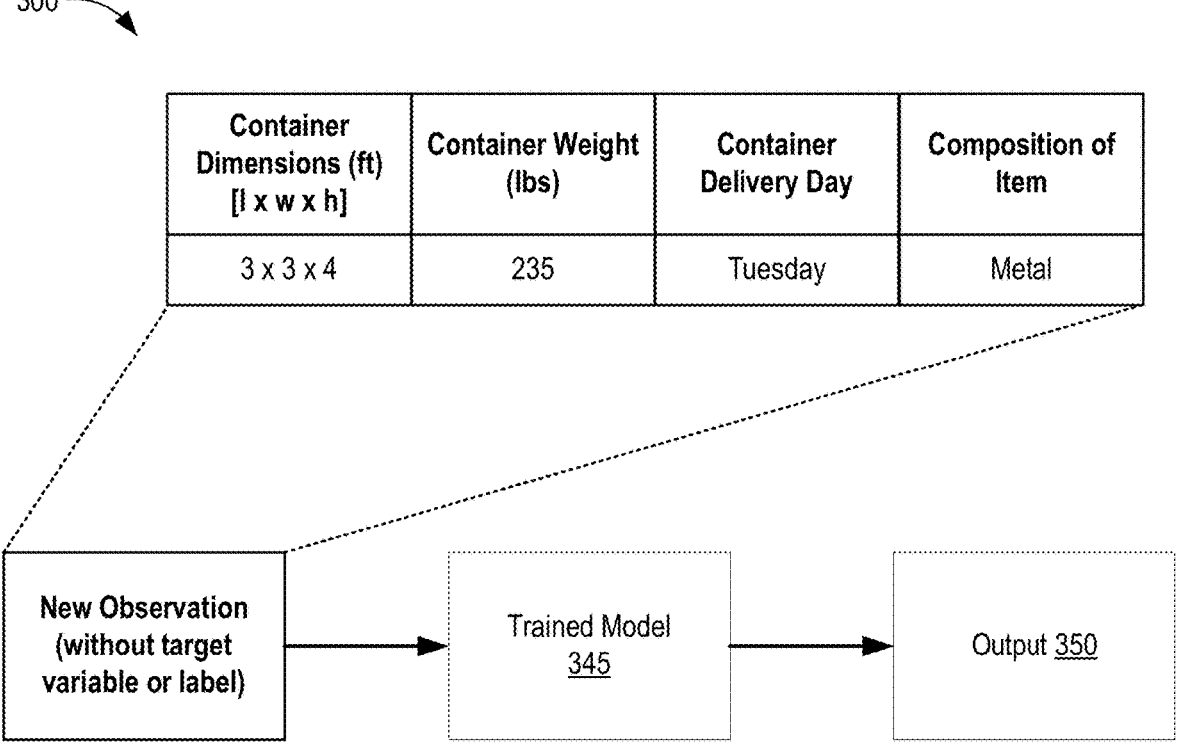
FIG. 3 is a diagram illustrating an example of applying a trained machine learning model to a new observation associated with characterizing a container scanned by a reading station.

FIG. 3 is a diagram illustrating an example 300 of applying a trained machine learning model to a new observation associated with characterizing a container scanned by a reading station, such as the reading station 110 of FIG. 1. The new observation (e.g., the result of the reading station 110 processing a container) may be input to a machine learning system that stores a trained machine learning model 345. In some implementations, the trained machine learning model 345 may be the trained machine learning model 245 described above in connection with FIG. 2. The machine learning system may include or may be included in a computing device, a server, or a cloud computing environment, such as the container management system 130 of FIG. 1.

As shown by reference number 210, the machine learning system may receive a new observation (or a set of new observations) and may input the new observation to the machine learning model 205. As shown, the new observation may include a first feature of container dimensions, a second feature of container weight, a third feature of delivery day, a third feature of composition of item, and so on. As shown, for the new observation, the first feature may have a value of "3×3×4", the second feature may have a value of "235", the third feature may have a value of "Tuesday", the fourth feature may have a value of "Metal", and so on.

The machine learning system may apply the trained machine learning model 345 to the new observation to generate an output 350 (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed. In some implementations, the output 350 includes an indication of an identity of an item in the presently scanned container. For example, the output can correspond to a "best guess" for what item(s) the presently scanned container includes, based on the input features. Furthermore, as described herein, in some cases, the output 350 includes a confidence value.

In some implementations, the trained machine learning model 345 may predict a value of "Product #1" and "96%" for the target variable for the new observation, indicating that there is a 96% likelihood that the container includes the item "Product #1." Based on this prediction (e.g., based on the value having a particular label or classification or based on the value satisfying or failing to satisfy a threshold), the machine learning system may provide a recommendation and/or output for determination of a recommendation, such a recommendation to rescan the container, a recommendation to store the output in storage (e.g., the inventory management system 120), among other examples. Additionally, or alternatively, the machine learning system may perform an automated action and/or may cause an automated action to be performed (e.g., by instructing another device to perform the automated action), such as causing a printer to print an indication of the item identifier on a label for attaching to the shipping container (when a confidence satisfies a confidence threshold) or outputting an instruction to manually open the shipping container and review the contents (when a confidence does not satisfy a confidence threshold).

As another example, if the machine learning system were to predict a value of "LOW" for the target variable of "confidence value", then the machine learning system may provide a different recommendation and/or may perform or cause performance of a different automated action (e.g., output an indication to manually review). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In this way, the machine learning system may apply a rigorous and automated process to identify the contents of containers accurately and efficiently. The machine learning system enables recognition and/or identification of tens, hundreds, thousands, or millions of features and/or feature values for tens, hundreds, thousands, or millions of observations, thereby increasing accuracy and consistency and reducing delay associated with the relative resources (e.g., computing or human) required to be allocated for tens, hundreds, or thousands of operators to manually identify the contents of containers using the features or feature values.

As indicated above, FIG. 3 is provided as an example. Other examples may differ from what is described in connection with FIG. 3.

As described herein, when the contents of a container are unknown, it can require significant resources to manually open boxes, count items, etc. To address these or other challenges, systems, and methods for displaying contents of a container in an augmented or other enhanced reality environment via a wearable device or other are described. A wearable system (also referred to herein as an enhanced reality (XR) system) can be configured to present two-dimensional (2D) or three-dimensional (3D) virtual images of contents of a package, which may overlayed or be superimposed on the respective package. By integrating enhanced or augmented reality into the container processing workflow, the wearable system allows user to "view" into the container without actually opening the container, thereby advantageously increasing the accuracy and consistency, and reducing delay associated with identifying the contents of containers.

Figure 4A:
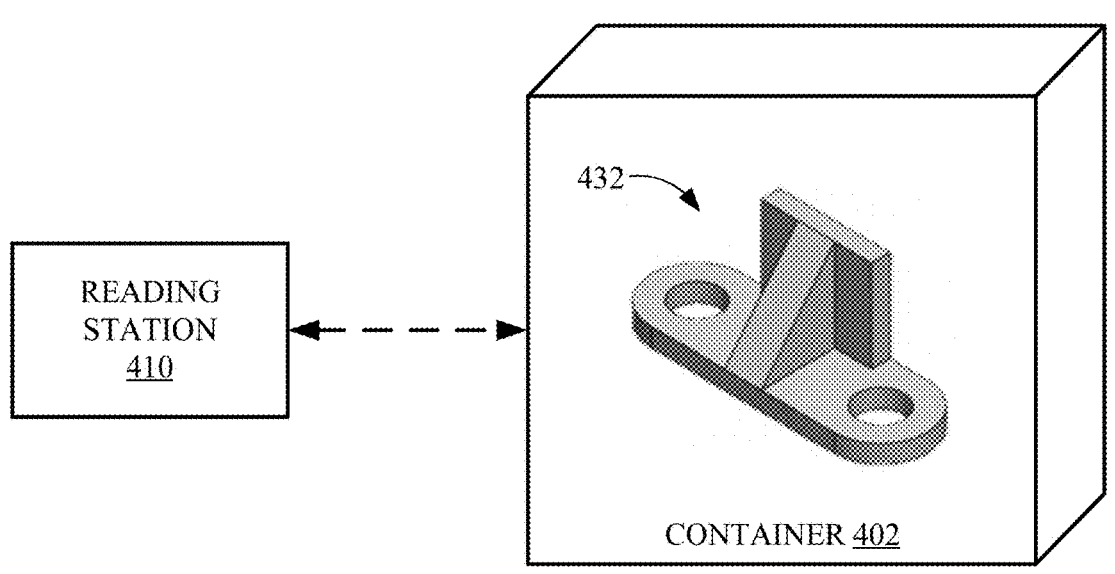
FIG. 4A is a diagram illustrating an example reading station scanning a container that includes an item.

FIG. 4A is a diagram illustrating an example reading station 410 scanning a container 402 that includes an item 432. The reading station 410 may be an embodiment of the reading station 110 of FIG. 1. As described herein, the reading station 410 can scan the container 402 to obtain container information including, but not limited to, dimensions of the container 402, weight of the container 402, a composition of the container 402, a material density of the item 432, a composition of the item 432, a day of arrival of the container 402, a shipping carrier that delivery the container 402, etc. For example, the reading station 410 may include an x-ray device that captures features (e.g., edges, surfaces, curves, outlines) of the item 432, which can be used to generate a virtual model of the item 432.

Figure 4B:
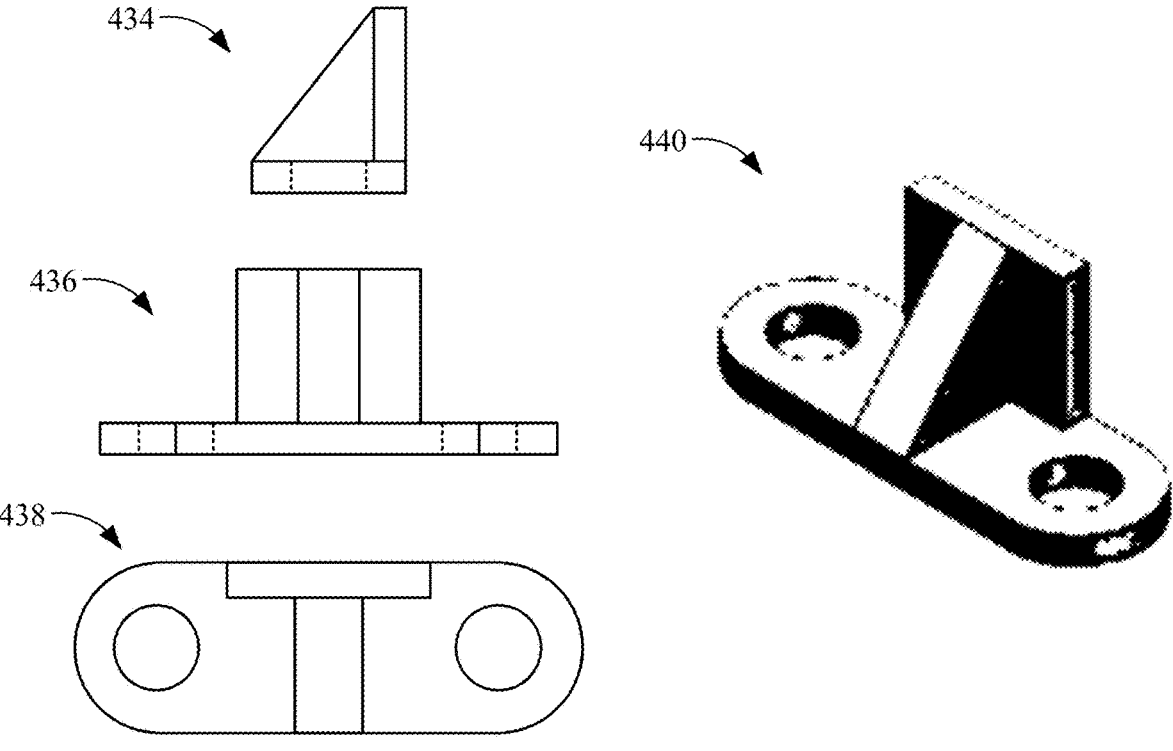
FIG. 4B illustrates example virtual models constructed by a container management system and/or displayed by an enhanced reality system.

FIG. 4B illustrates example virtual models constructed by a container management system, such as by the container management system 130 of FIG. 1, and/or displayed by an enhanced reality system, such as by the enhanced reality system 116 of FIG. 1. It will be appreciated that the virtual models 434, 436, 438, 440 represent example virtual models and other examples may be displayed differently.

A container management system, such as the container management system 130 of FIG. 1, can use the container information obtained by the reading station 410 to construct a 2D or 3D model of the item 432 and cause the virtual model to be displayed to a user via the XR system 130. FIG. 4B illustrates example views (e.g., a side view 434, a front view 436, a top view 438, a perspective view 440, etc.) of the virtual model, one or more of which may be displayed to a user.

The virtual model may be constructed in various ways. For example, in some cases, the virtual model is constructed using machine learning, such as using the trained machine learning model 345 of FIG. 3. For example, some or all of the container information and/or images of the container 402 can be input into a trained neural network that generates the virtual model. As another example, some or all the container information and/or images of the container 402 can be input into a trained neural network that determines an identity of the item 432. In some such cases, once the identity of the item is determined, the container management system 130 can access stored virtual model data (e.g., stored in the inventory management system) to obtain a virtual model that corresponds to the identified item.

The virtual model can be displayed using an enhanced reality system, such as the enhanced reality system 116. For example, the enhanced reality system 116 may display the model of the item 432 on the package 402 so that the virtual model is overlayed or be superimposed on the package 402. The virtual model 440 can be displayed from a perspective of a user wearing the enhanced reality system 116. In some such cases, as the user walks around the container 402 or otherwise changes his view of the container 402, the perspective of the virtual model 440 is updated with respect to the user's point-of-view location. For example, if the user views a front of the container 402, the enhanced reality system 116 can display a front perspective view of the virtual model 440, and if the user views a back of the container 402, the enhanced reality system 116 can update the display to display a back perspective view of the virtual model 440. The updates may occur in real time so as to give the illusion that the user has "x-ray vision" and can look into the container 402 using the enhanced reality system 116. In this way, the user can retain an accurate spatial understanding of the orientation of the item 432 within the container 402. In some cases, the enhanced reality system 116 can also display other information, such as confidence scores associated with the identity of the item 432 and/or with the accuracy of the virtual model.

Figure 5:
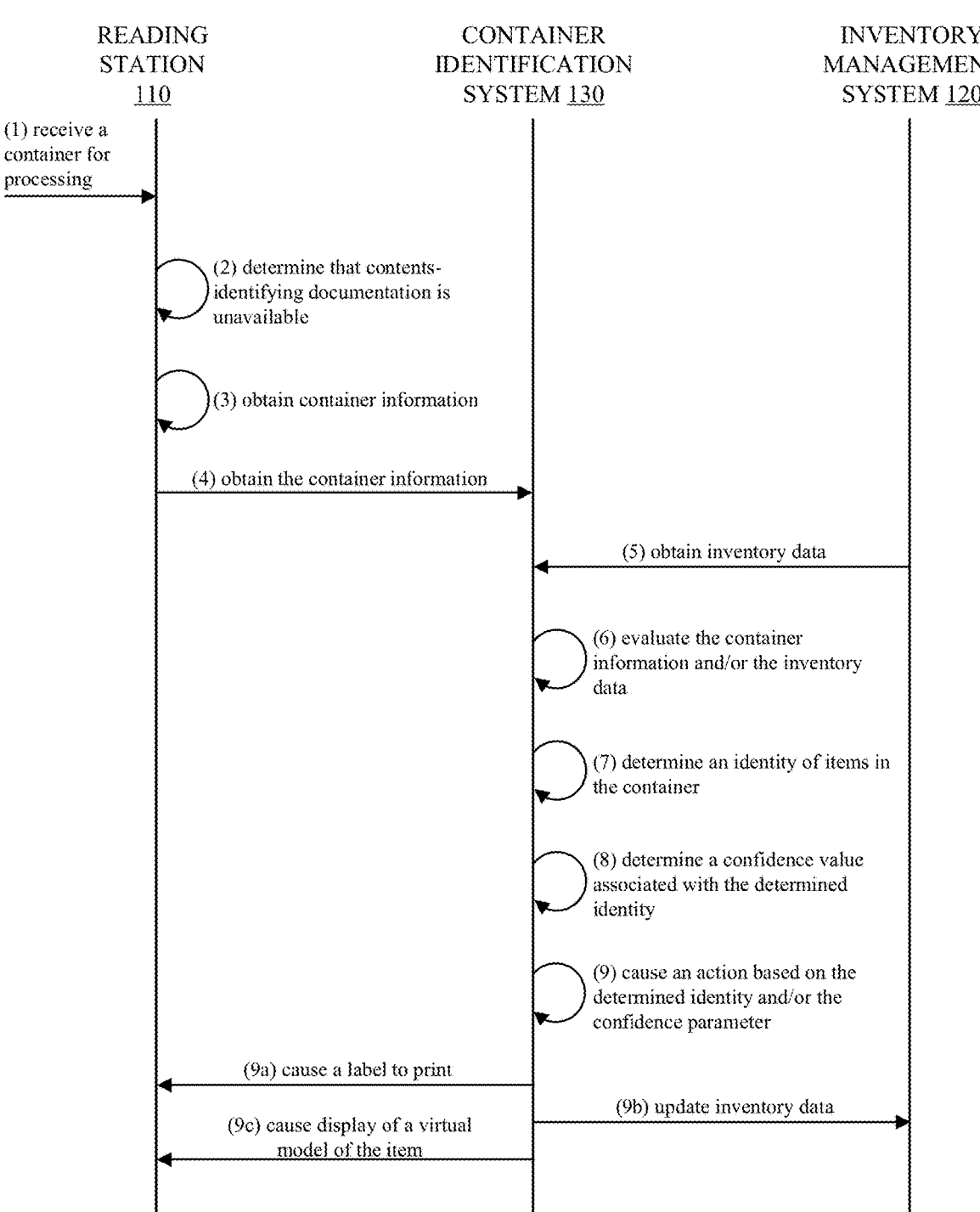
FIG. 5 is a data flow diagram illustrating an embodiment of the data flow and communications between a variety of the components of the inventory management environment to electronically identify the contents of a shipping container.

FIG. 5 is a data flow diagram illustrating an embodiment of the data flow and communications between a variety of the components of the inventory management environment 100 to identifying the contents of a shipping container. The data flow diagram of FIG. 5 illustrates an example of data flow and communications between the reading station 110, the inventory management system 120, and the container management system 130. However, it will be understood, that in some of embodiments, one or more of the interactions described herein with respect to FIG. 5 can be omitted, performed concurrently or in a different order and/or performed by a different component of the environment 100. Accordingly, the illustrated embodiment and description should not be construed as limiting.

At (1), the reading station 110 receives a container for processing. As described herein, the container holds one or more items therein, such as items intended for inclusion in inventory. Processing the container can include identifying a number and/or identity of the item(s) within the container so that an indication of the item can be added into inventory records and the container can be move to an appropriate place in the warehouse.

At (2), the reading station 110 determines whether contents-identifying documentation is available for the container. As described herein, contents-identifying documentation can include any documentation for the container that identifies the identity of the item(s) within the container. For example, contents-identifying documentation can include, but is not limited to, a packing slip, a shipping label, a receipt, etc.

The reading station 110 can determine whether contents-identifying documentation is available using any of a variety of techniques. For example, in some cases, the reading station 110 can obtain one or more images of the container and can process those images to determine whether contents-identifying documentation is present on an exterior of the container. For example, the reading station 110 and/or the container management system 130 may input the one or more images into a trained neural network that characterizes a likelihood that the image includes contents-identifying documentation and/or extracts the contents-identifying documentation from the image for further processing.

If contents-identifying documentation is determined not to be present on the exterior of the container, the reading station 110 can determine that the contents-identifying documentation is unavailable. As a corollary, if contents-identifying documentation is determined to be present on the exterior of the container, the reading station 110 can determine that the contents-identifying documentation is available. Alternatively, in some cases, the reading station 110 can further process the contents-identifying documentation to determine whether it is readable or otherwise able to be processed. For example, the reading station 110 (e.g., a trained neural network) may apply a text recognition application to attempt to convert an image of the contents-identifying documentation into recognizable text. In some cases, if the text recognition fails or the converted text does not satisfy a readability threshold (e.g., the contents-identifying documentation may have gotten wet and/or smeared so that at least some portions of the contents-identifying documentation cannot be readily discerned), the reading station 110 can determine that the contents-identifying documentation is unavailable. If the text recognition succeeds or the converted text satisfies a readability threshold, the contents-identifying documentation can be determined to be available.

If the reading station 110 determines that the contents-identifying documentation is unavailable, then the process 600 can proceed to interaction (3). Alternatively, in some cases, the reading station 110 determines that the contents-identifying documentation is available. In some such cases, the process 600 can obtain container information from the contents-identifying documentation and proceed to interaction (9). Alternatively, in some cases, even if the reading station 110 determines that the contents-identifying documentation is available, the process 600 can proceed to interaction (3).

At (3), the reading station 110 obtains container information relating to the container. As described herein, the reading station 110 can include one or more of an imaging device, an item-detection device, a weighing device, or a user input device for obtaining container information such as, but not limited to, a physical attribute of the container, a physical attribute of an item within the container or a collective attribute of items within the container, or logistics information relating to the container.

At (4) and (5), the container management system 130 obtain the container information from the reading station and obtains inventory data from the inventory management system 120.

At 6), the container management system 130 evaluates the container information and the inventory data. As described herein, evaluating the container information and the inventory data can include comparing the container information to portions of the inventory data to identify a match. For example, as described herein, the inventory data can include similar information to that of the container information. For example, the inventory data can include information relating to a plurality of items. As such, to evaluate the container information and the inventory data, the container management system 130 can compare the container information to the inventory data to find an item in the inventory data that includes associated information that matches the container information. In some cases, not all of the information will match. In some such cases, the container management system 130 identify inventory data that is most closely related to the container information. Furthermore, as described herein, the differences can be quantified via the confidence value. As described herein, in some cases, the evaluation can be performed using a machine learning model.

At (7), the container management system 130 determines an identity of the item. The identity of the item can include the item name, an alphanumeric identifier that can be used to identify (e.g., uniquely identify) the item, or another identifier of the item, such as a model number, serial number, etc. As described herein, the determination of the identity can be based on the evaluation at (6). In some cases, the identity is an output of a machine learned algorithm.

At (8), the container management system 130 determines a confidence value, or quality value, associated with the identity determined at interaction (7). In some cases, the confidence value represents a likelihood that the item identity is accurate. The confidence value can be a percentage value, a score on any scale, or the like. In some cases, to determine the confidence value, the container management system 130 can compare the container information (corresponding to the first shipping container) with stored inventory data (corresponding to the identified item). For example, the container management system 130 can calculate a higher confidence value based on the container information more closely matching the stored inventory data, or a lower confidence value based on the container information less closely matching the stored inventory data.

The confidence value can also be based determined at least in part on weighting values applied to different types of container information. For example, the weight of a container may be assigned a high weighting value, while a day of delivery may be assigned a lower weighting value. In some such cases, if the "weight" identified in the container information matches or is within a threshold of the weight identified in the stored inventory data, then a higher confidence value can be assigned to the identity, even if the day of delivery in the container information does not match the expected date of in the stored inventory.

At (9), the container management system 130 can cause an action based on the item identifier and/or the confidence parameter. For example, the container management system 130 can determine that if the confidence value is too low, the identity is not reliable. Alternatively, the container management system 130 can determine that the identity is reliable even when a confidence value is relatively low but may output an indication of the confidence value (for example, on a display) so that a user can determine whether to trust the identity determination. The container management system 130 can output an indication of the confidence value regardless of the value, whether it be high or low. The indication can be the value itself or some representation of that value, such as a graphic representation (for example, a bar with a size corresponding to the confidence value). As another example, if the confidence parameter indicates a high degree of confidence, the container management system 130 can (9b) communicate with the inventory management system 120 to update inventory data to include the receipt of the identified item or communicate with the reading station to (9a) cause a label or print or (9c) cause display of a virtual model of the item. As another example, if the confidence parameter indicates a low degree of confidence, the container management system 130 can perform a different action, such as (9d) initiating a request for manual review of the container. In addition or alternatively, instead of merely showing "error" or similar indication during times when confidence is low, the container management system 130 can provide the user with its best estimation of the identity of the item(s) in the container while indicating that some event has occurred that impacts the confidence.

It will be understood that the various interactions described with respect to FIG. 5 can be implemented in a variety of orders and/or can be implemented concurrently or in an altered order, as desired. In some cases, the data flow of FIG. 5 occurs in real-time or near-real time. In this way, the container is processed without causing a significant delay for the customer. Furthermore, it will be understood that fewer, more, or different blocks can be used as part of the data flow of FIG. 5. For example, in some cases, the container management system 110 may perform one or more of interactions (2) or (3). For example, the container management system 110 may determine whether contents-identifying documentation is available for the container and/or can determine at least some of the container information.

Figure 6:
FIG. 6 is a flow diagram illustrative of an embodiment of a routine implemented by a container management system for intelligently identifying contents of a shipping container.
Figure 6:
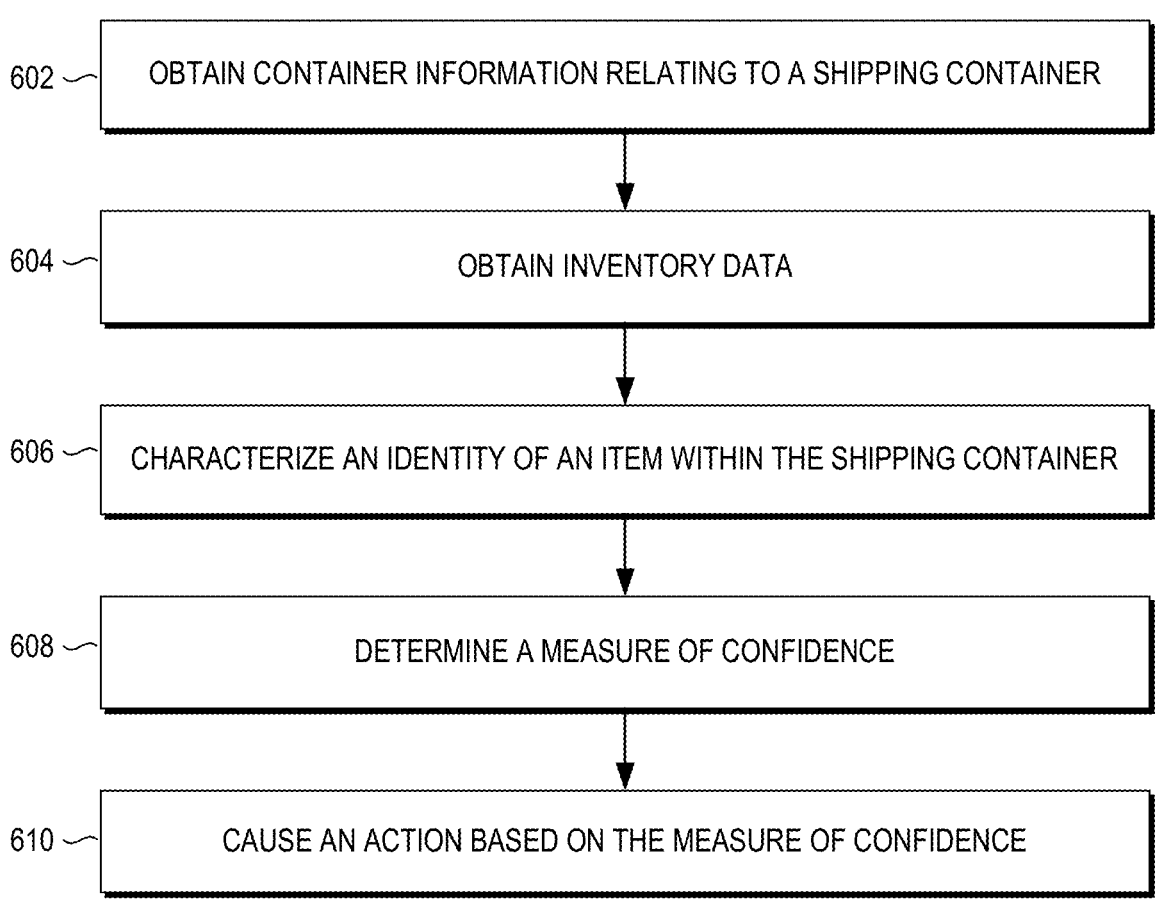

FIG. 6 is a flow diagram illustrative of an embodiment of an automated process 600 for identifying the contents of a shipping container. Although described as being implemented by the container management system 130, it will be understood that the elements outlined for process 600 can be implemented by one or more computing devices or components that are associated with the inventory management environment 100, such as, but not limited to, the reading station 110 or the inventory management system 120. Thus, the following illustrative embodiment should not be construed as limiting.

At block 602, the container management system 130 receives or otherwise obtains container information relating to a first shipping container. The first shipping container can include one or more items, such as one or more inventory items. As described herein, the reading station 100 can process the first shipping container to obtain container information that can be used to identify the identity of the one or more inventory items.

At block 604, the container management system 130 receives or otherwise obtains inventory data. As described herein, in some cases, at least a portion of the inventory data is stored locally, such as in a local data store. In addition or alternatively, at least a portion of the inventory data may be stored remotely, such as in the inventory catalog 124. As such, depending on the location of the inventory data, the container management system 130 obtains the inventory data from the local storage and/or from the inventory catalog. As described herein, the inventory data can include expected container information, such as expected weights, expected delivery dates, expected delivery carries, etc.

At block 606, the container management system 130 characterizes the identity of the item(s) in the first shipping container to identify a predicted identity of the item(s). The container management system 130 may characterize the identity of the item(s) in a variety of ways. For example, as described herein, the container management system 130 can compare the container information to the inventory data to identify a match or substantial similarities. In some cases, the container management system 130 utilizes a machine learned algorithm to characterize the identity of the item(s).

At block 608, the container management system 130 determines a confidence value associated with the characterization at block 606. In some cases, the confidence value corresponds to a degree to which the container information matches the inventory data associated with the identified item. For example, if the container information indicates the following: Container dimensions: 1×2×8; Container Weight: 128; and Delivery Day: Tuesday, and the inventory data for Product D indicates the following: Container dimensions: 1×2×8; Container Weight: 129.2; and Expected Delivery Day: Tuesday, then the container management system 130 may return a relatively high confidence score, since the container dimensions match, the weight is substantially similar (a 1.2-pound difference), and the package was delivered on the expected delivery day (Tuesday). As another example, if the container information indicates the following: Container dimensions: 2×4×5; Container Weight: 128; and Delivery Day: Tuesday, and the inventory data for Product D indicates the following: Container dimensions: 2×4×5; Container Weight: 527.2; and Expected Delivery Day: Thursday, then the container management system 130 may return a relatively low confidence score, since, despite the container dimensions matching, the weight is substantially different, and the package was not delivered on the expected delivery day. In some cases, the container management system 130 utilizes a machine learned algorithm to determine a confidence value.

In some cases, the container management system 130 determines a confidence value in accordance with a confidence generation policy. As part of generating the confidence value, the container management system 130 can obtain a confidence generation policy, which can be stored locally or in the inventory management system 120.

The confidence generation policy can indicate how to generate a confidence value. For example, the confidence generation policy can include a particular set of rules or instructions relating to assigning weighting values to the container information. For example, the confidence generation policy can indicate that the weight of the container should be weighted more heavily in a confidence value determination than a day of delivery. Similarly, the confidence generation policy can indicate that a composition of the item within the container should be weighted more heavily in a confidence value determination than dimensions of the container. In some such cases, a confidence score associated with unmatching dimensions may be higher than a confidence score associated with matching item compositions.

At block 610, the container management system 130 causes an action based on the confidence value. In some cases, if the confidence value indicates a satisfactory level of confidence, then action includes accepting the identification as accurate. For example, the action can include storing an indication, in the inventory management system 120, that the identified item has been received and processed. As another example, the action can include causing the label printer 114 to print a label or other documentation that indicates the identity of the item. The documentation can then be associated with (e.g., affixed to) the container so as to provide contents-identifying documentation for the container. In some cases, if the confidence value indicates an unsatisfactory level of confidence, then action includes rejecting the identification. For example, the action can include outputting an indication that a manual check should be performed.

It will be understood that the various blocks described with respect to FIG. 6 can be implemented in a variety of orders and/or can be implemented concurrently or in an altered order, as desired. For example, in some cases, the process 600 can be concurrently performed for multiple containers, such as tens, hundreds, or thousands of containers. In some cases, one or more blocks occurs in real-time or near-real time. Furthermore, it will be understood that fewer, more, or different blocks can be used as part of the data flow of FIG. 6.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the routines described elsewhere herein can be performed in a different sequence, can be added, merged, or left out altogether (non-limiting example: not all are necessary for the practice of the algorithms). Moreover, in certain embodiments, operations, acts, functions, or events can be performed concurrently, rather than sequentially.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

As used herein, the term "component" is intended to be broadly construed as hardware, firmware, or a combination of hardware and software.

These and other changes can be made to the present disclosure in light of the above Detailed Description. While the above description describes certain examples of the present disclosure, and describes the best mode contemplated, no matter how detailed the above appears in text, the present disclosure can be practiced in many ways. Details of the system may vary considerably in its specific implementation, while still being encompassed by the present disclosure disclosed herein. As noted above, particular terminology used when describing certain features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed in the specification, unless the above Detailed Description section explicitly defines such terms. Accordingly, the actual scope of the present disclosure encompasses not only the disclosed examples, but also all equivalent ways of practicing or implementing the present disclosure under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

What is claimed is:

1. A method comprising:
   determining that contents-identifying documentation for a shipping container is unavailable, wherein the shipping container stores a set of unidentified inventory items;
   capturing scan data of the shipping container using a non-invasive sensing system, wherein the scan data comprises imagery of exterior surfaces of the shipping container and internal content signatures representative of the set of unidentified inventory items;
   processing the scan data using an image recognition module comprising a trained machine learning model to extract a set of physical attributes of one or more items of the set of unidentified inventory items, wherein extracting the physical attributes comprises detecting object boundaries, contours, and shape features from the scan data, the set of physical attributes comprising at least a dimensional parameter, a shape attribute, and a material composition indicator;

characterizing a predicted item identifier associated with the one or more items of the set of unidentified inventory items based on a comparison between the set of physical attributes and stored inventory data, wherein the stored inventory data comprises a plurality of item identifiers and expected physical attributes, such that each item identifier of the plurality of item identifiers is associated with a respective set of expected container information;

determining a confidence value associated with the predicted item identifier, wherein the confidence value is determined by evaluating a similarity between the extracted set of physical attributes and the expected physical attributes associated with the predicted item identifier, wherein evaluating the similarity comprises comparing shape attributes, object boundaries, and contour features included in the extracted set of physical attributes to corresponding features in the expected physical attributes;

generating a virtual model of the predicted item identifier using at least one of the physical attributes associated with the predicted item identifier, wherein the virtual model comprises a computed three-dimensional representation of the item; and causing a see-through head-mounted display to render at least a portion of the virtual model, wherein the at least a portion of the virtual model is rendered as an augmented reality overlay that overlays on the shipping container and is spatially aligned with the shipping container in real time based at least in part on detected geometric boundaries of the shipping container and orientation data associated with the see-through head-mounted display.

2. The method of claim 1, wherein virtual model comprises a 2D model, a 3D model, an augmented reality (AR) model, a mixed reality (MR) model, or a digital image.

3. The method of claim 1, wherein the scan data comprises x-ray data corresponding to an x-ray scan of the shipping container, wherein the generating the virtual model is based on the x-ray data.

4. The method of claim 3, further comprising determining a composition of the one or more items in the shipping container based on the x-ray data.

5. The method of claim 1, wherein the scan data includes x-ray data corresponding to an x-ray scan of the shipping container, and wherein the characterizing the predicted item identifier is based on the x-ray data.

6. The method of claim 1, wherein the scan data further comprises logistics information relating to the shipping container, wherein the logistics information comprises information relating to a day of arrival of the shipping container, or a shipping carrier associated with the shipping container.

7. The method of claim 1, wherein capturing the scan data is responsive to the determining that contents-identifying documentation for the shipping container is unavailable.

8. The method of claim 7, wherein the contents-identifying documentation comprises at least one of a packing slip or a shipping label.

9. The method of claim 7, wherein the determining that contents-identifying documentation for the shipping container is unavailable comprises:

applying text recognition on an image of a packing slip associated with the shipping container; and determining that the contents-identifying documentation is unavailable based on a determination that results of the text recognition are not satisfactory.

10. The method of claim 7, wherein the determining that contents-identifying documentation for the shipping container is unavailable comprises:

capturing one or more images of the shipping container;

processing the one or more images to determine that a packing slip is absent from the one or more images; and determining that the contents-identifying documentation is unavailable based on the absence of the packing slip.

11. The method of claim 1, wherein the set of physical attributes comprises one or more dimensions of the shipping container, a weight of the shipping container, or a composition of the shipping container, and wherein the set of physical attributes comprises one or more dimensions of the one or more items and a composition of the one or more items.

12. The method of claim 1, further comprising causing an action based on the confidence value, wherein the action includes generating an indication of the predicted item identifier when the confidence value satisfies a confidence threshold, and an indication of low confidence when the confidence value does not satisfy the confidence threshold, wherein responsive to the confidence value satisfying a confidence threshold, the action comprises causing a computing device to generate an indication of the predicted item identifier.

13. The method of claim 12, wherein responsive to the confidence value not satisfying a confidence threshold, the action comprises generating virtual indication to manually open the shipping container.

14. The method of claim 1, wherein the shipping container comprises at least one of a corrugated box, a crate, or an envelope.

15. A system for identifying contents of a shipping container, the system comprising:

a display configured to be positioned in front of an eye of a user;

a reading station for scanning shipping containers using at least one of an imaging system, a weighing system, or an x-ray system and generating scan data corresponding thereto; and a container management system communicatively coupled to the reading station and the display, the container management system configured to:

receive, from the reading station, scan data relating to a shipping container, wherein the scan data comprises imagery of exterior surfaces of the shipping container and internal content signatures representative of a set of unidentified inventory items, process the scan data using an image recognition module comprising a trained machine learning model to extract a set of physical attributes of one or more items of the set of unidentified inventory items, wherein extracting the physical attributes comprises detecting object boundaries, contours, and shape features from the scan data, the set of physical attributes comprising at least a dimensional parameter, a shape attribute, and a material composition indicator;

characterize a predicted item identifier associated with the one or more items of the set of unidentified inventory items based on a comparison between the set of physical attributes and stored inventory data, wherein the stored inventory data comprises a plurality of item identifiers and expected physical attributes, such that each item identifier of the plurality of item identifiers is associated with a respective set of expected container information, determine a confidence value associated with the predicted item identifier, wherein the confidence value is determined by evaluating a similarity between the extracted set of physical attributes and the expected physical attributes associated with the predicted item identifier, wherein evaluating the similarity comprises comparing shape attributes, object boundaries, and contour features included in the extracted set of physical attributes to corresponding features in the expected physical attributes, generate a virtual model of the predicted item identifier using at least one of the physical attributes associated with the predicted item identifier, wherein the virtual model comprises a computed three-dimensional representation of the item, and cause the display to render at least a portion of the virtual model, wherein the at least a portion of the virtual model is rendered as an augmented reality overlay that overlays on the shipping container and is spatially aligned with the shipping container in real time based at least in part on detected geometric boundaries of the shipping container and orientation data associated with the display.

16. The system of claim 15, wherein the set of physical attributes comprises one or more dimensions of the shipping container, a weight of the shipping container, or a composition of the shipping container, and wherein the set of physical attributes comprises one or more dimensions of the item or a composition of the item.

17. The system of claim 15, wherein the scan data comprises x-ray data corresponding to an x-ray scan of the shipping container, wherein the virtual model is generated based on the x-ray data.

* * * * *